United States Patent

[11] 3,624,086

| [72] | Inventor | Carl Peter Krimmel |
| | | Wauconda, Ill. |
| [21] | Appl. No. | 875,556 |
| [22] | Filed | Nov. 10, 1969 |
| [45] | Patented | Nov. 30, 1971 |
| [73] | Assignee | G. D. Searle & Co. |
| | | Chicago, Ill. |

[54] ADAMANTANECARBOXAMIDOALKANOIC ACID AMIDES
5 Claims, No Drawings

[52] U.S. Cl........................................ 260/268 R,
260/247.1, 260/247.2 A, 260/268 C, 260/293.4 F,
260/294 A, 260/404, 424/248, 424/250, 424/267
[51] Int. Cl........................................ C07d 51/70
[50] Field of Search.............................. 260/268 R,
247.7 A, 294 A, 247.1, 293.4 R

[56] References Cited
UNITED STATES PATENTS

| 3,573,312 | 3/1971 | Krimmel...................... | 268/268 X |
| 3,218,355 | 11/1965 | Paulschock .................. | 260/268 X |
| 3,300,480 | 1/1967 | Narayawan................... | 260/541 X |
| 3,338,900 | 8/1967 | Bernstein ..................... | 260/268 |
| 3,352,912 | 11/1967 | Prichard....................... | 260/563 |
| 3,374,244 | 3/1968 | Krimmel....................... | 260/268 X |

Primary Examiner—Donald G. Daus
Attorneys—John M. Brown, John J. Kolano, Elliot N. Schubert, Walter C. Ramm and Helmuth A. Wegner ABSTRACT: The present adamantanecarboxamidoalkanoic acid amides possess antibiotic activity against a variety of organisms. Thus, they are antibacterial, antiprotozoal, antifungal, antialgal, and anthelmintic agents. In addition, they are antiulcer agents. The compounds can be prepared by the reaction of an adamantanecarboxamidoalkanoyl halide, preferably the chloride, with an appropriate amine.

ADAMANTANECARBOXAMIDOALKANOIC ACID AMIDES

The present invention relates to amides of adamantanecarboxamidoalkanoic acids. Alternately, the present compounds can be considered as adamantanecarbonyl derivatives of amino acid amides. Specifically, the present invention relates to compounds having the following general formula

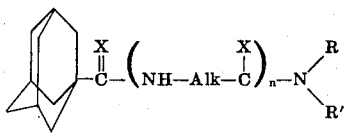

wherein $n$ is a small positive integer with an upper limit of 6; X is selected from the group consisting of O and S; Alk is an alkylene radical; and

is selected from the group consisting of piperidino, morpholino, and 4-(lower alkyl)-1-piperazinyl.

The alkylene radicals referred to above contain up to ten carbon atoms and can be exemplified by methylene, ethylene, propylene, trimethylene, tetramethylene, pentamethylene, decamethylene, and the like. The lower alkyl radicals referred to above contain up to six carbon atoms and can be exemplified by methyl, ethyl, propyl, and the like.

The compounds of this invention are useful because of their antibiotic activity. In particular, they inhibit the growth of bacteria such as Diplococcus pneumoniae, protozoa such as Tetrahymena gelleii, Tritrichomonas foetus, and Trichomonas vaginalis, fungi such as Trichophyton mentagrophytes, algae such as Chlorella vulgaris, and nematodes such as Turbatrix aceti. The present compounds can thus be combined with various known excipients and adjuvants in the form of dusts, solutions, suspensions, ointments, and sprays to provide compositions useful for disinfecting purposes. These compounds also inhibit germination of seeds of Trifolium.

The antifungal utility of the present compounds is demonstrated by the following standardized test procedure to determine their capacity to prevent the growth of Trichophyton mentagrophytes. In the test, 2 concentrations of Sabouraud dextrose agar (manufactured by Baltimore Biological Laboratories or Difco) are prepared, one as recommended by the manufacturer and the other at twice this concentration. These preparations are sterilized and then maintained in a fluid state at 80° C. Meanwhile, a compound to be tested is heated in sterile distilled water at a concentration of 2,000 mcg. per ml. and a temperature of 80° C. for 20 minutes. An equivolume mixture of this preparation and the double strength agar is serially diluted and mixed with the single strength agar in amounts such that concentrations of 1,000, 100, 10, and 1 mcg. of test compound per ml. result. The mixtures thus obtained are allowed to cool and solidify, whereupon they are surface-inoculated with a suspension of T. mentagrophytes and then incubated aerobically at room temperature for 6–7 days. Controls are provided by concurrent incubations identical with the foregoing except for the absence of compound. Activity is determined by gross examination as to whether any growth of test organism is discernible. Under these conditions, 4-[N-(adamantane-1-carbonyl)-11-aminoundecanoyl]morpholine and 1-[N-adamantane-1-thiocarbonyl)-11-aminothioundecanoyl]-4-methylpiperazine each inhibited the growth of the fungus at a concentration of 1,000 mcg. per ml.

The anthelmintic utility of the present compounds is demonstrated in a standardized test procedure for their capacity to immobilize Turbatrix aceti, a representative nematode. In this test, the compound is heated in sterile distilled water at a concentration of 2,000 mcg. per ml. and a temperature of 80° C. for 20 minutes, whereupon an equal volume mixture of the compound preparation and a washed aqueous suspension of T. aceti containing approximately 2,000 nematodes per ml. is incubated aerobically at room temperature for 40 hours and then examined grossly for the presence of motile nematodes. If any are observed, the compound is considered inactive. If no motile nematodes are observed, the incubated mixture is serially diluted and mixed with a freshly prepared and washed aqueous suspension of T. aceti containing approximately 1,000 nematodes per ml. in amounts such that concentrations of 100, 10 and 1 mcg. of compound per ml. result. The mixtures thus obtained are incubated as before and then examined grossly for the presence of motile nematodes. Controls are provided by concurrent incubations identical with the foregoing except for the absence of compound. When tested by the above procedure, 1-[N-(adamantane-1-caronyl)-ω-aminocaproyl]-4-methylpiperazine, 1-[N-(adamantane-1-carbonyl)-11-aminoundecanoyl]-4-methylpiperazine, and 1-[N-(adamantane-1-thiocarbonyl)-11-aminothioundecanoyl]-4-methylpiperazine each inhibited T. aceti at a concentration of 1,000 mcg. per ml. or less.

The compounds of the present invention are further useful as antiulcer and antigastrin agents. The antiulcer utility of these compounds can be demonstrated by their ability to inhibit ulceration in the Shay rat. The ulceration occurs in rats subjected to fasting and pyloric ligation as reported by Shay et al., Gastroenterology, 5, 43 (1945). In the test, male Charles River rats weighing 200–250 grams and fasted 72 hours prior to ligation are used. Immediately following ligation, the prescribed dose of compound dissolved or suspended in 1.0 ml. of pH 2.0 hydrochloric acid is intragastrically administered to each of a group of six animals. A like group of animals receives the acid alone and serves as controls. Precisely 19 hours later, the stomachs of surviving animals are excised and examined under 5× magnification Any ulcers present are rated according to number and size and a compound found to produce a significant decrease in ulceration compared to the control animals is rated as active. When 1-[N-(adamantane-1-carbonyl)-ω-aminocaproyl]-4-methylpiperazine, 1-[N-(adamantane-1-carbonyl)-11-aminoundecanoyl]-4-methylpiperazine and 1-[N-(adamantane-1-thiocarbonyl)-11-aminothioundecanoyl]-4-methylpiperazine were tested at 50 mg. according to this procedure, each produced a significant decrease in ulceration.

The compounds of the present invention are conveniently prepared by the reaction of an appropriate amine with an adamantanecarboxamidoalkanoyl halide, preferably the chloride, having the following formula

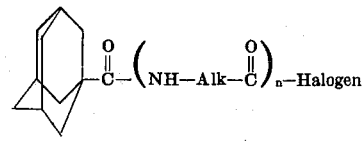

wherein $n$ and Alk are defined as above. The reaction is carried out at reflux in an inert solvent such as benzene. Alternately, the present compounds can be prepared by the reaction of adamantane-1-carbonyl chloride with an amino acid amide of the following formula

wherein $n$, Alk, and —NRR′ are defined as above.

The thioamides of the present invention are prepared by reacting the appropriate oxygen amide with phosphorus pentasulfide.

The following examples are presented to further illustrate the present invention; they should not be construed as limiting it in spirit or in scope. In these examples, quantities by weight are indicated in grams, quantities by volume are indicated by milliliters, and temperatures are indicated by degrees centigrade (°C.).

EXAMPLE 1

A mixture of 4.0 grams of adamantane-1-carboxylic acid and 27 ml. of thionyl chloride is refluxed on a steam bath for 30 minutes. The mixture is then distilled under reduced pressure to remove excess thionyl chloride. Azeotropically dried benzene is added to the residue and vacuum distillation is resumed to remove the final traces of thionyl chloride. The residual adamantane-1-carbonyl chloride is then dissolved in 130 ml. of dry acetone and the resultant solution is added, in one batch, to a vigorously stirred solution of 2.9 grams of ω-aminocaproic acid and 3.8 grams of sodium hydroxide in 95 ml. of water. The resultant warm reaction mixture is then heated on a steam bath to remove the acetone. The remaining aqueous solution is treated with decolorizing charcoal, cooled, and acidified with dilute hydrochloric acid. The solid precipitate which forms is separated by filtration, washed with water, air dried, and then dissolved in 30 ml. of 2-butanone. The resultant hot solution is filtered through decolorizing charcoal and infusorial earth. The solution is then concentrated, seeded, and cooled. The solid which forms is separated by filtration to give N-(adamantane-1-carbonyl)-ω-aminocaproic acid melting at about 104°–120° C.

When the above procedure is repeated using 2.2 grams of β-alanine in place of the 2.9 grams of ω-aminocaproic acid and the crude product obtained is recrystallized from 100 ml. of refluxing 2-butanone, N-(adamantane-1-carbonyl)-β-alanine melting at about 178°–183° C. is obtained.

EXAMPLE 2

A solution of 8.0 parts of adamantane-1-carbonyl chloride in 200 ml. of dry acetone is added in one batch, with vigorous stirring at room temperature, to a solution of 10.1 grams of 11-aminoundecanoic acid, 7.6 grams of sodium hydroxide, and 200 ml. of distilled water. The mixture is heated on a steam bath to remove the acetone and the aqueous residue is cooled in ice and acidified with dilute hydrochloric acid. The precipitate which forms is separated by filtration, dried in a stem cabinet, and recrystallized from 2-butanone to give N-(adamantane-1-carbonyl)-11-aminoundecanoic acid melting at about 122°–127° C.

EXAMPLE 3

A mixture of 6.0 grams of N-(adamantane-1-carbonyl)-ω-aminocaproic acid and 30 ml. of thionyl chloride is refluxed on a steam bath for 3 hours. The unreacted thionyl chloride is removed by distilling the mixture under reduced pressure on a steam bath. Azeotropically dried benzene is added to the residue and distillation is resumed to remove the final traces of the thionyl chloride. After removal of the benzene, the residual acid chloride is dissolved in 40 ml. of anhydrous benzene and 2.1 grams of 1-methylpiperazine is added slowly with vigorous stirring. The resulting mixture is refluxed for 1 hour and the benzene is removed by distillation under reduced pressure on a steam bath. The residue is dissolved in distilled water and the resulting aqueous solution is extracted with ether, treated with charcoal, and filtered through diatomaceous earth. The filtrate is saturated with potassium carbonate and then extracted with benzene. The benzene extract is dried over anhydrous sodium sulfate, treated with charcoal, and filtered through diatomaceous earth. The benzene is then removed from the filtrate under reduced pressure and the residue is distilled to give 1-[N-(adamantane-1-carbonyl)-ω-aminocaproyl]-4-methylpiperazine distilling at 280°–290° C. at 2.5 mm. pressure. This compound has the following formula

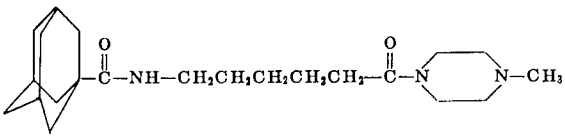

EXAMPLE 4

The procedure of example 3 is repeated using an equivalent quantity of N-(adamantane-1-carbonyl)-β-alanine in place of N-(adamantane-1-carbonyl)-ω-aminocaproic acid. In this case, the product is 1-[N-(adamantane-1-carbonyl)-β-alanyl]-4-methylpiperazine.

EXAMPLE 5

N-(adamantane-1-carbonyl)-11-aminoundecanoyl chloride is prepared from 6.0 grams of N-(adamantane-1-carbonyl)-11-aminoundecanoic acid and 30 ml. of thionyl chloride by following the procedure given in example 3 for the preparation of N-(adamantane-1-carbonyl)-ω-aminocaproyl chloride. The acid chloride is then dissolved in 30 ml. of anhydrous benzene and 1.6 grams of 1-methylpiperazine is added slowly with vigorous stirring. An exothermic reaction takes place with the immediate separation of a precipitate. However, the reaction mixture is refluxed on a steam bath for 1 hour and the resulting homogeneous solution is allowed to cool. The cooled mixture is extracted with distilled water and the separated aqueous solution is extracted once with benzene and then with ethyl ether before it is treated with charcoal and filtered through diatomaceous earth. The aqueous solution is then made alkaline with potassium carbonate and extracted with ether. The ether extract is treated with charcoal and dried over anhydrous sodium sulfate and the solvent is evaporated on a steam bath to leave a viscous syrup. This product is 1-[N-(adamantane-1-1-carbonyl)-11-aminoundecanoyl]-4-methylpiperazine and it has the following formula

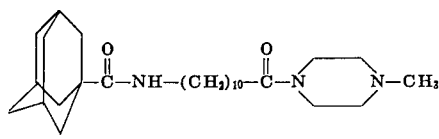

EXAMPLE 6

Without further purification, 3.5 grams of the 1-[N-(adamantane-1-carbonyl)-11-aminoundecanoyl]-4-methylpiperazine obtained in example 5 is dissolved in 100 ml. of anhydrous ethyl ether, mixed with decolorizing carbon, and filtered through diatomaceous earth. The filtrate is added, slowly with stirring, to a solution of 0.7 grams of anhydrous oxalic acid in 150 ml. of anhydrous ethyl ether. A precipitate forms and this is allowed to stand before the mixture is filtered and the solid is washed with anhydrous ether and dried in the air. The solid is then dissolved in approximately 50 ml. of refluxing 2-butanone, treated with charcoal, and filtered hot through diatomaceous earth. A finely divided precipitate forms when the filtrate is cooled and it is separated by filtration, washed with 2-butanone and dried. The product obtained in this way is 1-[N-(adamantane-1-carbonyl)-11-aminoundercanoyl]-4-methylpiperazine oxalate melting at about 106°–112° C.

EXAMPLE 7

The procedure of example 5 is repeated using N-(adamantane-1-carbonyl)-11-aminoundecanoic acid and 1-propylpiperazine. The product obtained is 1-[N-(adamantane-1-carbonyl)-11-aminoundecanoyl]-4-propylpiperazine.

EXAMPLE 8

To a solution of 3.5 parts of 1-[N-(adamatane-1-carbonyl)-11-aminoundecanoyl]piperazine in 30 ml. of anhydrous pyridine there is added 0.8 gram of phosphorus pentasulfide and the resulting mixture is heated on a steam bath for 1 hour. The clear orange solution which results is cooled and poured into 400 ml. of cold distilled water. An orange oil separates and the mixture is allowed to stand. The supernatant aqueous solution is decanted and the oil is washed with water by decantation. The oil is then dissolved in 50 percent ethyl ether-benzene and this -[-aminothioundecanoyl]-methylpiperazine solution is dried over anhydrous sodium sulfate, treated with charcoal and filtered. The resulting filtrate is concentrated to a viscous yellow oil by evaporation of the solvent on a steam bath. A solution of 2.1 grams of the residual yellow oil in 60 ml. of anhydrous ethyl ether is first filtered to remove some slight turbidity and then mixed with a solution of 0.4 gram of anhydrous oxalic acid dissolved in 70 ml. of anhydrous ethyl ether. A pale yellow precipitate forms and the mixture is stirred and then filtered. The separated solid is washed with anhydrous ethyl ether and then dried to give 1-[N-(adamantane-1-thiocarbonyl)-11-aminothioundecanoyl]-4-methylpiperazine oxalate melting at about 81°–87° C. The free base of this compound has the following formula

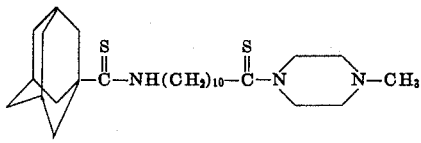

EXAMPLE 9

7.0 Parts of N-(adamantane-1-carbonyl)-11-aminoundecanoic acid is converted to the corresponding acid chloride using 30 ml. of thionyl chloride and the procedure of example 5. The resulting acid chloride is dissolved in 30 ml. of azeotropically dried benzene and to this solution there is added, at room temperature with stirring, 3.3 grams of morpholine. The resulting reaction mixture is refluxed for 2 hours and then allowed to stand for 16 hours. It is then diluted with 200 ml. of benzene and extracted twice with water. The benzene solution is dried over sodium sulfate, treated with charcoal, and filtered through diatomaceous earth. When the solution is distilled under reduced pressure, the benzene is removed first and distillation is continued to give 4-[N-(adamantane-1-carbonyl)-11-aminoundecanoyl]morpholine boiling at about 250°–300° C. at 1.5 mm. pressure. This product can be further purified by dry column chromatography.

EXAMPLE 10

The procedure of example 9 is repeated using 2.3 grams of piperidine in place of 3.3 grams of morpholine. In this case, the product is collected as a pale orange syrup distilling at about 240°–260° C. at 0.5 mm. pressure. The product is 1-[N-(adamantane-1-carbonyl)-11-aminoundecanoyl]piperidine.

What is claimed is:

1. A compound of the formula

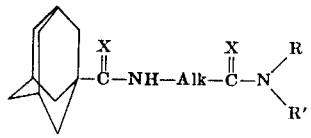

wherein Alk is alkylene having from two to 10 carbon atoms; X is selected from the group consisting of O and S; and

is selected from the group consisting of piperidino, morpholino, and 4-(lower alkyl)-1-piperazinyl.

2. A compound according to claim 1 which has the formula

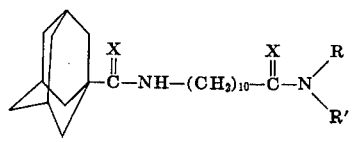

wherein X is selected from the group consisting of O and S; and

is selected from the group consisting of piperidino, morpholino, and 4-(lower alkyl)-1-piperazinyl.

3. A compound according to claim 1 which is 1-[N-(adamantane-1-carbonyl)-ω-aminocaproyl]-4-methyl piperazine.

4. A compound according to claim 1 which is 1-[N-(adamantane-4-carbonyl)-11-aminoundecanoyl]-4-methylpiperazine.

5. A compound according to claim 1 which is 1-[N-(adamantane-4-thiocarbonyl)-11-aminothioundecanoyl]-4-methylpiperazine.

* * * * *

UNITED STATES PATENT OFFICE
CERTIFICATE OF CORRECTION

Patent No. 3,624,086          Dated November 30, 1971

Inventor(s) Carl Peter Krimmel

It is certified that error appears in the above-identified patent and that said Letters Patent are hereby corrected as shown below:

Column 1, first formula, $$\text{"}-\text{Alk}-\overset{\overset{X}{|}}{C})\text{"} \quad \text{should be} \quad -- \quad -\text{Alk}-\overset{\overset{X}{\|}}{C}) \quad --;$$

Column 2, line 21, "-caronyl)" should be -- carbonyl) --;

Column 3, line 50, "stem" should be -- steam --;

Column 4, line 44, "adamantane-1-1-carbonyl)" should be -- adamantane-1-carbonyl) --;

Column 4, line 74, "aminoundercanoyl]" should be -- amino=undecanoyl] --;

Column 5, line 10, "11-aminoundecanoyl[piperazine" should be -- 11-aminoundecanoyl]-4-methylpiperazine --;

Column 5, line 18, delete "-[-aminothioundecanoyl]-methylpipera=zinc;

Column 6, line 2, "2.3 grams" should be -- 3.2 grams --;

Column 6, line 54, "-4-carbonyl)" should be -- -1-carbonyl) --; and

Column 6, line 56, "-4-thiocarbonyl)" should be -- 1-thiocarbonyl)

Signed and sealed this 25th day of July 1972.

(SEAL)
Attest:

EDWARD M. FLETCHER, JR.
Attesting Officer

ROBERT GOTTSCHALK
Commissioner of Patents